US012699926B2

(12) United States Patent
Mazor

(10) Patent No.: US 12,699,926 B2
(45) Date of Patent: Aug. 4, 2026

(54) MACHINE LEARNING CLASSIFICATION WITH CONFIDENCE THRESHOLD AND SIMILARITY-BASED VALIDATION

(71) Applicant: GENESYS CLOUD SERVICES, INC., Menlo Park, CA (US)

(72) Inventor: Igal Mazor, Tel-Aviv (IL)

( * ) Notice: Subject to any disclaimer, the term of this patent is extended or adjusted under 35 U.S.C. 154(b) by 729 days.

(21) Appl. No.: 18/087,958

(22) Filed: Dec. 23, 2022

(65) Prior Publication Data

US 2024/0211799 A1 Jun. 27, 2024

(51) Int. Cl.
*G06N 20/00* (2019.01)
*G06N 5/04* (2023.01)

(52) U.S. Cl.
CPC .............. *G06N 20/00* (2019.01); *G06N 5/04* (2013.01)

(58) Field of Classification Search
None
See application file for complete search history.

(56) References Cited

U.S. PATENT DOCUMENTS

2022/0188642 A1 6/2022 Rajapakse

OTHER PUBLICATIONS

Jiang et al., To Trust Or Not To Trust A Classifier, 32nd Conference on Neural Information Processing Systems (NeurIPS 2018), Montréal, Canada; pp. 1-12 (Year: 2018).*
Chung et al., Maximizing Cosine Similarity Between Spatial Features for Unsupervised Domain Adaptation in Semantic Segmentation; arXiv:2102.13002v3 [cs.CV] Mar. 18, 2021; Total Pages: 14 (Year: 2021).*
Hemmer et al., DEAL: Deep Evidential Active Learning for Image Classification; arXiv:2007.11344v1 [cs.LG] Jul. 22, 2020; Total Pages: 8 (Year: 2020).*
International Search Report and Written Opinion received Apr. 10, 2024 regarding co-pending PCT application having application No. PCT/US2023/082711.
Miao Xiong et al.: "Birds of a Feather Trust Together: Knowing When to Trust a Classifier via Adaptive Neighborhood Aggregation", arxiv.org, Cornell University Library, 201 Olin Library Cornell University, Ithaca, NY 14853, Nov. 29, 2022, XP091382295.
Draszawka, Karol et al.: "Thresholding Strategies for Large Scale Multi-Label Text Classifier", 2013 6th International Conference on Human System Interactions, IEEE, Jun. 6, 2013, pp. 350-355, XP032475635.

* cited by examiner

*Primary Examiner* — Alan Chen

(57) ABSTRACT

A method and a system for improving classification of data samples, which may be considered as class outliers, are claimed. The method includes inferring a pretrained classifying ML-based model on the incoming data sample, to assign a particular class of a plurality of classes thereto; calculating a similarity metric value representing a degree of similarity between the incoming data sample and one or more previously classified data samples of the particular class; and validating assignment of the particular class to the incoming data sample, based on the calculated similarity metric value.

18 Claims, 5 Drawing Sheets

---

S1005: Receiving at least one incoming data sample.

S1010: Inferring a pretrained classifying machine-learning (ML)-based model on the at least one incoming data sample, to assign a particular class of a plurality of classes thereto.

S1015: Calculating a similarity metric value representing a degree of similarity between the at least one incoming data sample and one or more previously classified data samples of the particular class.

S1020: Validating assignment of the particular class to the at least one incoming data sample, based on the calculated similarity metric value, thereby obtaining at least one classified incoming data sample.

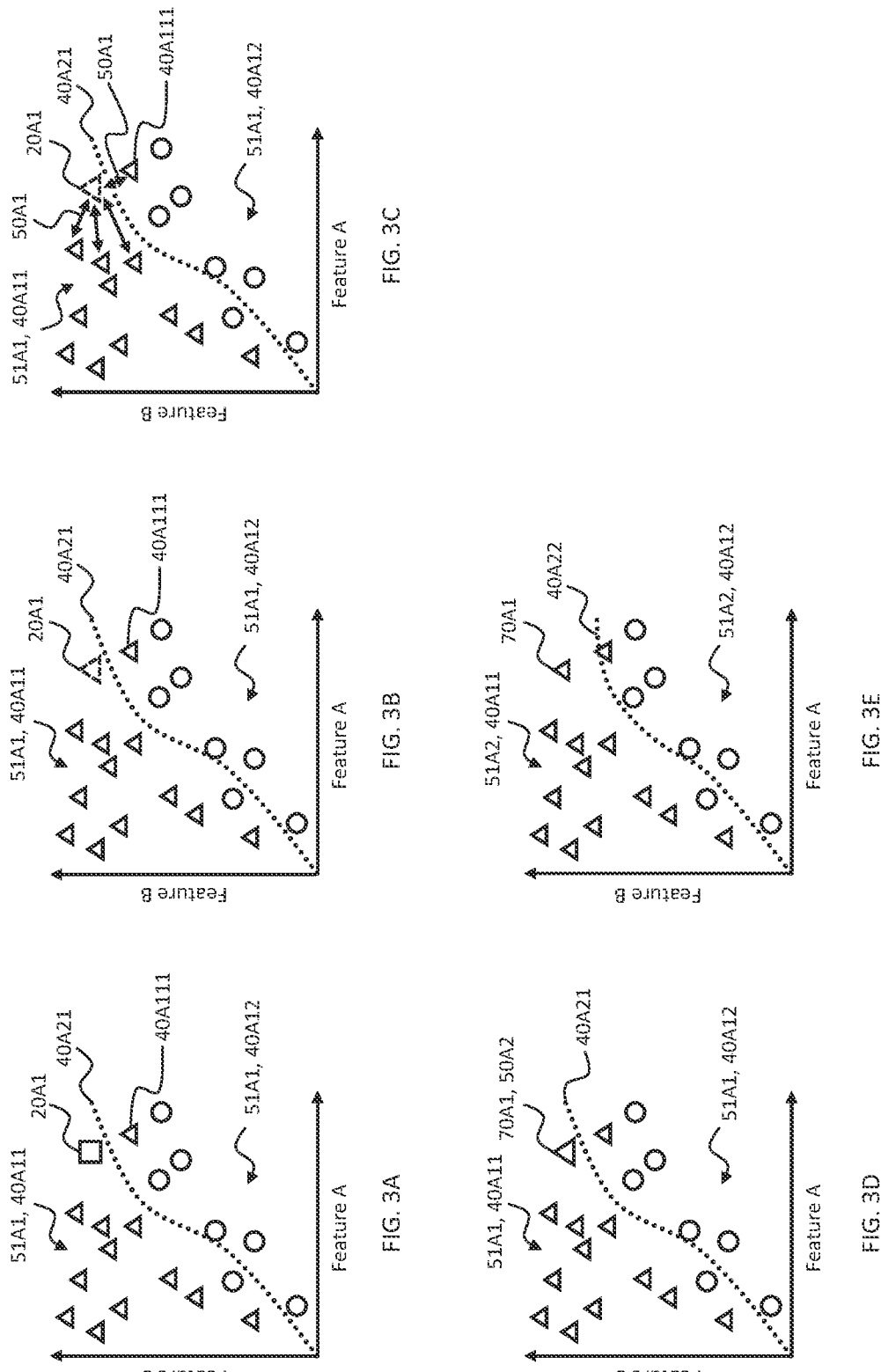

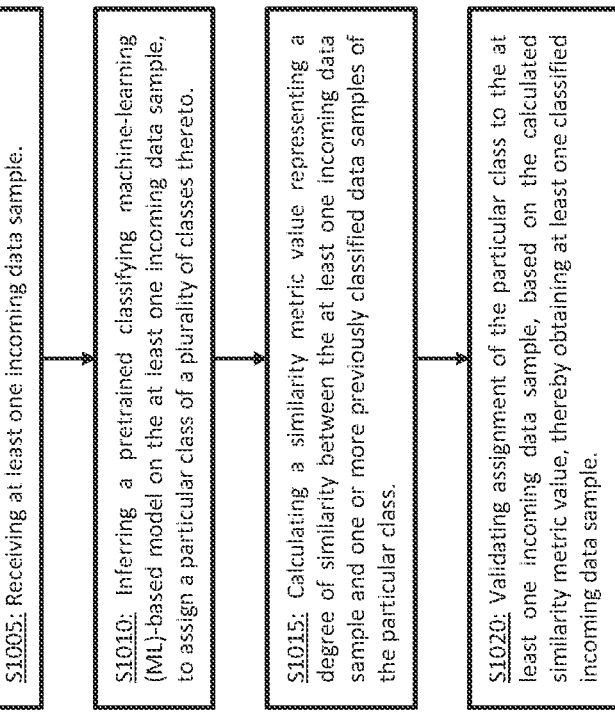

S1005: Receiving at least one incoming data sample.

S1010: Inferring a pretrained classifying machine-learning (ML)-based model on the at least one incoming data sample, to assign a particular class of a plurality of classes thereto.

S1015: Calculating a similarity metric value representing a degree of similarity between the at least one incoming data sample and one or more previously classified data samples of the particular class.

S1020: Validating assignment of the particular class to the at least one incoming data sample, based on the calculated similarity metric value, thereby obtaining at least one classified incoming data sample.

FIG. 4

MACHINE LEARNING CLASSIFICATION WITH CONFIDENCE THRESHOLD AND SIMILARITY-BASED VALIDATION

FIELD OF THE INVENTION

The present invention relates generally to machine learning (ML) and artificial intelligence (AI). More specifically, the present invention relates to aspects of ML-based classification techniques.

BACKGROUND OF THE INVENTION

As known, development of mathematical models that can learn from, and make predictions on data is a general purpose of machine learning. In particular, supervised and semi-supervised machine learning includes model training using so-called "training dataset" (or "supervisory dataset") and testing using "inference dataset". The term "training dataset" is commonly referred to as a set of annotated (labeled, classified) data samples, wherein annotations provide associations of the data samples with a plurality of classes (in case of classification ML tasks). In other words, annotated data samples represent pairs of input and output vectors (or scalars) for training a machine learning model. The ML-based model iteratively analyzes data samples of a training dataset to produce a result, which is then compared with a target result corresponding to annotations of data samples in the training dataset. Based on the comparison, a supervised learning algorithm determines the optimal combinations of model variables that will provide the highest prediction reliability. In the end, well-trained models must show sufficiently reliable results when analyzing unknown data.

ML-based classification techniques known in art may provide highly reliable prediction in most cases, especially when distribution of data samples in feature space is sufficiently even (with respect to both training and inference data samples). However, there are cases when data samples are distributed unevenly, e.g., when the majority of data samples are densely grouped in certain locations of feature space, but there is a minority of data samples (also called "outliers" or "anomalies"), which are significantly different from the data samples of the majority, hence they are distributed unevenly and located far from the group of the majority.

An illustrative example described below may be found in the natural language processing (NLP) field of AI research.

A chatbot system is an ML-based software application used to conduct an on-line chat conversation in text or text-to-speech form in lieu of providing direct contact with a live human agent. Even though, in most cases, human agents may still be reached, their involvement in the conversation is undesirable and it is used only for situations when the chatbot system failed to reply in an automatic manner.

Requests to the chatbot system provided by a user represent textual data samples that are used as inference data for respectively pretrained ML-based classification model. The model classifies received textual data samples, and then the chatbot system generates a response depending on the assigned class. The decision as to which class to assign in each specific case is based on evaluation of a confidence metric value calculated by ML-based classification model. The confidence metric value represents the confidence of assignment of the particular class to respective data sample. Obviously, requests that have generally the same meaning may nevertheless significantly differ in the way they are formulated by the user, thereby dramatically affecting the confidence of the ML-based classification. Hence, mitigation of the effect that outlying user request formulations provide remains a research topic nowadays.

For example, one of the approaches known in the prior art suggests solving the problem by applying a deterministic classification model prior to the ML-based classification model. The deterministic classification model checks if the incoming textual data sample (users' requests) received in inference time is an exact match to any labeled data sample pertaining to one of the classes in the training dataset. If an exact match is found, then the incoming data sample is classified as pertaining to the same class, thereby avoiding having a misclassification or forwarding the request to the human agent. However, users' requests have numerous variations, hence, looking for an exact match in all classes renders this approach ineffective.

Other known approaches may include lowering the threshold of the confidence metric value. However, it can increase the number of errors and decrease ML-based model performance. Yet another known approach suggests continuing to improve ML-based model by increasing the training dataset. However, such an improvement takes time in order to collect data and it still cannot guarantee that the new unseen incoming data samples will not receive low confidence and fall under the threshold.

As can be seen, there are certain approaches directed to mitigating this problem known in the art, but still there is a lack of sufficiently effective and universally applicable solutions in this regard.

SUMMARY OF THE INVENTION

Accordingly, there is a need for a system and method for classifying data samples, which would provide a technical improvement of ML-based classification by increasing reliability of classification with respect to data samples which may be considered as class outliers.

To overcome the shortcomings of the prior art, the following invention is provided.

In the general aspect, the invention may be directed to a method of classifying data samples by at least one processor, the method including receiving at least one incoming data sample; inferring a pretrained classifying machine learning (ML)-based model on the at least one incoming data sample, to assign a particular class of a plurality of classes thereto; calculating a similarity metric value representing a degree of similarity between the at least one incoming data sample and one or more previously classified data samples of the particular class; and validating assignment of the particular class to the at least one incoming data sample, based on the calculated similarity metric value, thereby obtaining at least one classified incoming data sample.

In another general aspect, the invention may be directed to a system for classifying data samples, the system including a non-transitory memory device, wherein modules of instruction code are stored, and at least one processor associated with the memory device, and configured to execute the modules of instruction code, whereupon execution of said modules of instruction code, the at least one processor is configured to receive at least one incoming data sample; infer a pretrained classifying machine learning (ML)-based model on the at least one incoming data sample, to assign a particular class of a plurality of classes thereto; calculate a similarity metric value representing a degree of similarity between the at least one incoming data sample and one or more previously classified data samples of the particular class; and validate assignment of the particular class to the at least one incoming data sample, based on the calculated similarity metric value, thereby obtaining at least one classified incoming data sample.

In some embodiments, calculating the similarity metric value is performed by using a validating ML-based model, wherein the validating ML-based model is configured to calculate the similarity metric value based on the at least one incoming data sample and the one or more previously classified data samples of the particular class.

In some embodiments, the validating ML-based model is a nearest neighbor type classifier.

In some embodiments, validating the assignment of the particular class to the at least one incoming data sample further includes determining that the calculated similarity metric value exceeds a predefined similarity metric value threshold.

In some embodiments, calculating the similarity metric value with respect to the one or more previously classified data samples of the particular class is performed serially, to find at least one of the previously classified data samples, for which the calculated similarity metric value exceeds the predefined similarity metric value threshold.

In some embodiments, the at least one incoming data sample and the one or more previously classified data samples are represented as vectors and the similarity metric value is a cosine similarity metric value.

In some embodiments, the classifying ML-based model is pretrained so as to assign classes of the plurality of classes to data samples.

In some embodiments, the classifying ML-based model is pretrained based on an initial training dataset, the initial training dataset comprising a plurality of data samples having classes of the plurality of classes assigned thereto.

In some embodiments, the method further comprises performing supplementary training of the classifying ML-based model, based on the at least one classified incoming data sample.

In some embodiments, the supplementary training of the classifying ML-based model includes supplementing the initial training dataset with the at least one classified incoming data sample, thereby obtaining a supplemented training dataset; and training the classifying ML-based model to assign classes of the plurality of classes to data samples, based on the supplemented training dataset.

In some embodiments, inferring the classifying ML-based model includes calculating a confidence metric value representing confidence of the assignment of the particular class to the at least one incoming data sample; and triggering validating the assignment of the particular class to the at least one incoming data sample, when the calculated confidence metric value does not exceed a predefined confidence metric value threshold.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 3A-3E are diagrams, explaining the concept of the claimed invention in the classification example, according to some embodiments;

FIG. 4 is a flow diagram, depicting a method of classifying data samples, according to some embodiments.

Figure 1:
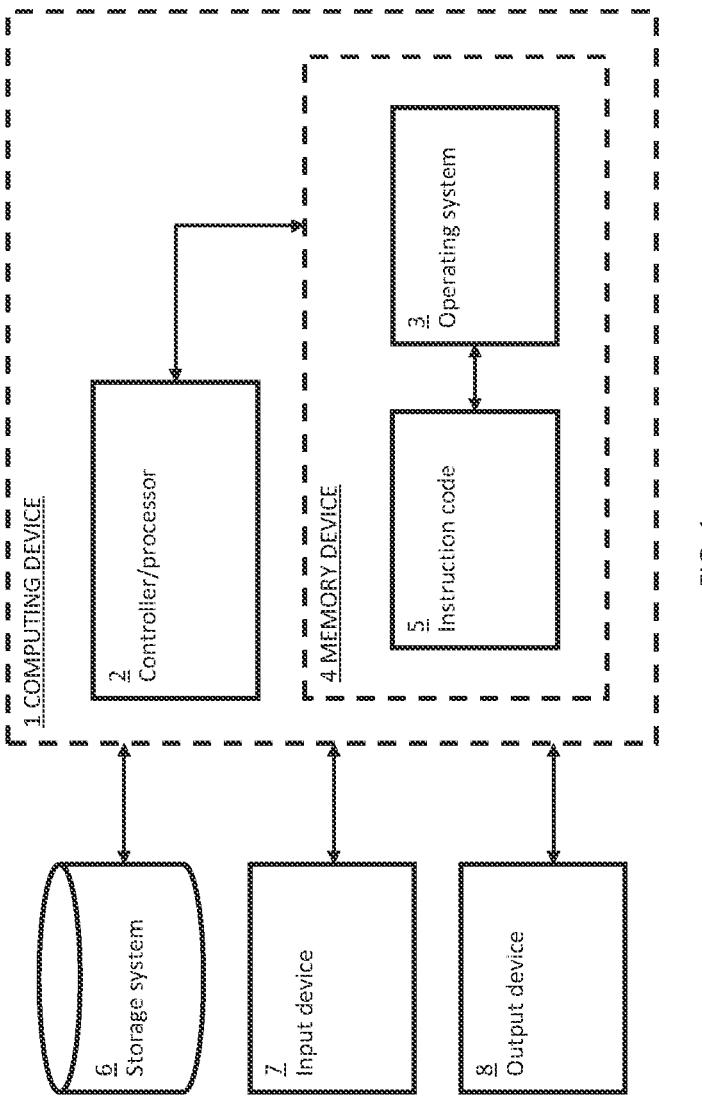
FIG. 1 is a block diagram, depicting a computing device which may be included in a system for classifying data samples, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", "choosing", "selecting", "omitting", "training" or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other non-transitory information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Although embodiments of the invention are not limited in this regard, the terms "lower", "higher", "surpassing" or the like in relation to the term "threshold" should be interpreted respectively depending on the context. E.g., when "confidence metric value is lower than confidence metric value threshold" it should be understood as "low confidence metric value" or "not confident enough"; when "similarity metric value surpasses similarity metric value threshold" it should be understood as "high similarity metric value" or "similar enough".

Unless explicitly stated, the method embodiments described herein are not constrained to a particular order or sequence. Additionally, some of the described method embodiments or elements thereof can occur or be performed simultaneously, at the same point in time, concurrently, or iteratively and repeatedly.

In some embodiments of the present invention, ML-based model may be an artificial neural network (ANN).

A neural network (NN) or an artificial neural network (ANN), e.g., a neural network implementing a ML or AI function, may refer to an information processing paradigm that may include nodes, referred to as neurons, organized into layers, with links between the neurons. The links may transfer signals between neurons and may be associated with weights. A NN may be configured or trained for a specific task, e.g., data samples classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g., CPUs or graphics processing units (GPUs), or a dedicated hardware device may perform the relevant calculations.

It should be obvious to one ordinarily skilled in the art that various ML-based models can be implemented without departing from the essence of the present invention. It should also be understood, that in some embodiments ML-based model may be a single ML-based model or a set (ensemble) of ML-based models realizing as a whole the same function as a single one. Hence, in view of the scope of the present invention, the abovementioned variants should be considered equivalent.

In some respects, the following description of the claimed invention is provided in relation to the task of classification of incoming data samples that are users' requests (e.g., textual messages) in a chatbot system. The purpose of improving the classification in such a task is to reduce the number of cases that require replying to users' requests manually (i.e., decrease human intervention). In the same manner, the invention may be related, for example, to a voice bot system, an email bot system, an SMS bot system, etc. Such a specific purpose and embodiments of the invention directed to it are provided in order for the description to be sufficiently illustrative and they are not intended to limit the scope of protection claimed by the invention. It should be understood for those ordinarily skilled in the art that the implementation of the claimed invention in accordance with said task is provided as a non-exclusive example and other practical implementations can be covered by the claimed invention, such as any implementations utilizing the claimed method of classifying data samples regardless of whether the purpose of such classification is related to chatbot system aspects, or it is related to different tasks.

The concept of the claimed invention lies in boosting the performance of ML-based classifying model by adding specific validation stage, aimed to checking whether the ML-based classifying model has assigned the correct class and approving or disapproving this assignment respectively. The claimed validation stage incorporates a nearest neighbor type approach, which consists in assessing the degree of similarity between the incoming data sample and known reliably labeled data samples (e.g., previously classified by ML-based model or data scientist). The important aspect of the claimed approach lies in that, unlike the traditional nearest neighbor type classifying approach, the assessment of the degree of similarity is made only in relation to the labeled data samples of the class assigned by the ML-based classifying model in the preceding stage. Since the assessment of the degree of similarity is made with respect to each of the labeled data samples of the assigned class, the sensitivity to the outliers of the class is boosted.

As known, sensitivity to outliers is commonly considered one of the main disadvantages of a traditional nearest neighbor type classifying approach that is aimed to perform binary or multiclass classification, since excessive sensitivity dramatically decreases classification reliability. Consequently, the prior art teaches away from using approach of this type in classification tasks where classes have outliers. However, when it is used in relation to only one class, as in the claimed approach, such sensitivity is used in an advantageous manner. In the claimed invention, the sensitivity of the nearest neighbor type classifying approach is used to assess whether the incoming data sample, which is not sufficiently similar to the majority of the data samples of the class, is similar enough to the outliers of the class.

In the context of the present description, the term "outlier" or "outlying data sample", when mentioned in relation to training (labeled) dataset, shall be understood as data sample significantly different from the majority of data samples of the same class. E.g., an outlier may be located far from the group of the majority in the feature space. The term "outlier" or "outlying" data sample shall not be confused with "incorrectly labeled" data sample or data samples that "actually belong to another class".

Reference is now made to FIG. 1, which is a block diagram depicting a computing device, which may be included within an embodiment of the system for classifying data samples, according to some embodiments.

Computing device 1 may include a processor or controller 2 that may be, for example, a central processing unit (CPU) processor, a chip or any suitable computing or computational device, an operating system 3, a memory device 4, instruction code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to instruction code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory device 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory device 4 may be or may include a plurality of possibly different memory units. Memory device 4 may be a computer or processor non-transitory readable medium, or a computer non-transitory storage medium, e.g., a RAM. In one embodiment, a non-transitory storage medium such as memory device 4, a hard disk drive, another storage device, etc. may store instructions or code which when executed by a processor may cause the processor to carry out methods as described herein.

Instruction code 5 may be any executable code, e.g., an application, a program, a process, task, or script. Instruction code 5 may be executed by processor or controller 2 possibly under control of operating system 3. For example, instruction code 5 may be a standalone application or an API module that may be configured to train or infer ML-based model, calculate the similarity metric value, validate assignment of the particular class etc., as further described herein. Although, for the sake of clarity, a single item of instruction code 5 is shown in FIG. 1, a system according to some embodiments of the invention may include a plurality of executable code segments or modules similar to instruction code 5 that may be loaded into memory device 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Various types of input and output data may be stored in storage system 6 and may be loaded from storage system 6 into memory device 4 where it may be processed by processor or controller 2. In some embodiments, some of the components shown in FIG. 1 may be omitted. For example, memory device 4 may be a non-volatile memory having the storage capacity of storage system 6. Accordingly, although shown as a separate component, storage system 6 may be embedded or included in memory device 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 2A:
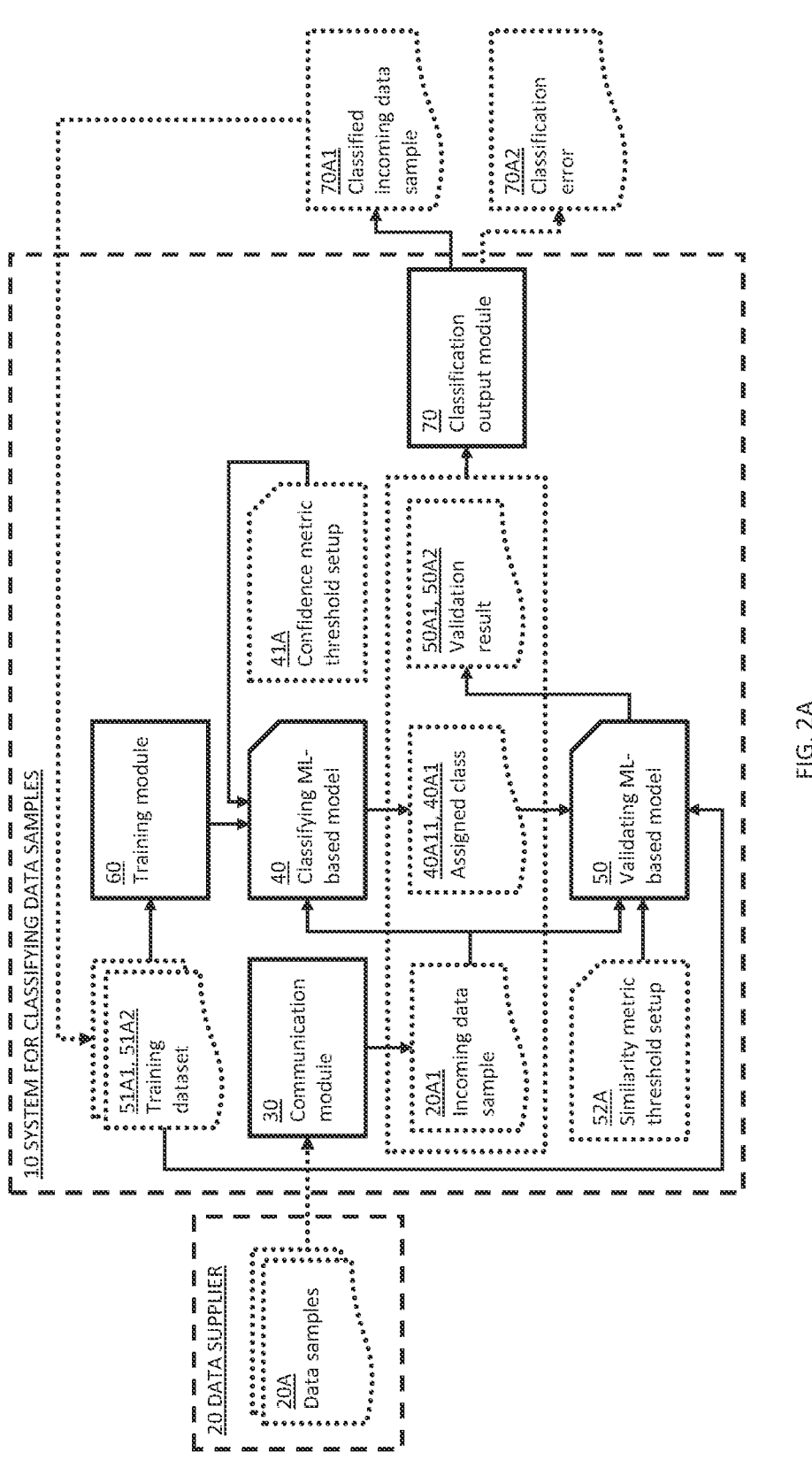
FIG. 2A is a block diagram, depicting a system for classifying data samples, according to some embodiments.

Reference is now made to FIG. 2A, which depicts a system 10 for classifying data samples 20A, according to some embodiments.

According to some embodiments of the invention, system 10 may be implemented as a software module, hardware module, or any combination thereof. For example, system 10 may be or may include a computing device such as element 1 of FIG. 1. Furthermore, system 10 may be adapted to execute one or more modules of instruction code (e.g., element 5 of FIG. 1) to request, receive, analyze, calculate and produce various data. As further described in detail herein, system 10 may be adapted to execute one or more modules of instruction code (e.g., element 5 of FIG. 1) in order to receive incoming data samples 20A, infer pretrained classifying ML-based model 40 on incoming data samples 20A, calculate similarity metric value 50A1, validate assignment of classes (e.g., of assigned class 40A11) to incoming data samples 20A, based on calculated similarity metric value 50A1, thereby obtain classified incoming data sample 70A1 etc.

As shown in FIG. 2A, arrows may represent the flow of one or more data elements to and from system 10 and/or among modules or elements of system 10. Some arrows have been omitted in FIG. 2A for the purpose of clarity.

In some embodiments, system 10 may include communication module 30. Communication module 30 may be configured to receive incoming data samples 20A, e.g., provided by data supplier 20. It should be understood that, depending on the classification task, data samples 20A may be or may include image, video, audio, textual data etc. E.g., in respect to the embodiment of the invention related to chatbot system, data samples 20A may represent users' requests in the form of textual messages.

Communication module 30 may be further configured to parse incoming data samples 20A and to communicate incoming data sample 20A1 of data samples 20A to other modules of system 10, as described in detail below.

In some embodiments, system 10 may further include classifying ML-based model 40 and validating ML-based model 50.

System 10 may be further configured to infer classifying ML-based model 40 on incoming data sample 20A1. Classifying ML-based model 40 may be a ML-based model pretrained so as to assign classes of the plurality of classes (predefined depending on the particular classification task) to data samples 20A. In some embodiments, classifying ML-based model 40 may be pretrained based on an initial training dataset (e.g., training dataset 51A1). The initial training dataset (e.g., training dataset 51A1) may include a plurality of data samples (e.g., having same type and structure as incoming data samples 20A) and classes of the plurality of classes assigned thereto.

In some embodiments, classifying ML-based model 40 may be based on commonly used algorithms, e.g., artificial neural networks, random forest, naïve bayes classifier etc.

In some alternative embodiments, classifying ML-based model 40 may be based on kernel estimation methods (e.g., k-nearest neighbor algorithm). However, it should be understood that, in this respect, kernel estimation methods are to be applied in a usual manner (i.e., as a binary or multiclass classifier). It shall not be confused with the nearest neighbor type approach that, in the present invention, is directed to validation of assignment of the particular class to incoming data sample 20A1.

Classifying ML-based model 40 may be further configured to assign a particular class (e.g., class 40A11) of the plurality of classes to incoming data sample 20A1. In some embodiments, classifying ML-based model 40 may be further configured to calculate confidence metric value 40A1 representing confidence of assignment of the particular class (e.g., assigned class 40A11) to incoming data sample 20A1. System 10 may be further configured to communicate incoming data sample 20A1 and assigned class 40A11 to validating ML based model 50 and trigger validating the assignment of class 40A11 when confidence metric value 40A1 does not exceed a predefined confidence metric value threshold (e.g., predefined by confidence metric threshold setup 41A).

In some embodiments, validating ML-based model 50 may be configured to perform validation procedure as further described in detail herein.

In some embodiments, validating ML-based model 50 may be a nearest neighbor type model (e.g., nearest neighbor type classifier) configured as described below.

Validating ML-based model 50 may be further configured to receive incoming data sample 20A1 and class 40A11 assigned thereto. Validating ML-based model 50 may be further configured to calculate similarity metric value 50A1 based on received incoming data sample 20A1 and previously classified data samples of the particular class (e.g., class 40A11).

The previously classified data samples may be, for example, taken from the plurality of data samples of training dataset 51A1. In some alternative embodiments, the previously classified data samples may be data samples of a separate dataset, not joined with training dataset 51A1.

It should be understood that, in the context of the present description, the term "previously classified data samples" should be considered regardless of the method by which the "previous classification" was performed. E.g., in some embodiments, the previously classified data samples may be provided by data scientist using manual labeling and be provided in the form of a training dataset. In this respect, terms "labeled", "classified" and "previously classified" should be considered equivalent. In some alternative embodiments, the previously classified data samples may be provided by applying ML-based classification, e.g., by applying the method claimed herein or by applying completely irrelevant one. It should also be understood that training or pretraining of classifying ML-based model 40 and validating ML-based model 50 are not constrained to any specific order of sequence and may be performed both sequentially (in any order) or simultaneously.

Similarity metric value 50A1 may represent a degree of similarity between incoming data sample 20A1 and previously classified data samples of the particular class (e.g., class 40A11). Calculation of similarity metric value 50A1 may be performed by using methods known in the art. For example, in some embodiments, incoming data sample 20A1 and previously classified data samples (e.g., data samples of training dataset 51A1) may be represented as vectors and similarity metric value 50A1 may be a cosine similarity metric value. In embodiments where data samples 20A contain textual data, the vector representation of data samples 20A may be calculated by known text embedding techniques, e.g., word2vec or term frequency-inverse document frequency (TF-IDF). Vector representation calculation with respect to both incoming data samples 20A and previously classified data samples may be performed either by system 10 or by external systems or modules.

In some embodiments, validating ML-based model 50 may be configured to validate assignment of the particular class (e.g., class 40A11) to incoming data sample 20A1, based on calculated similarity metric value 50A1, and provide respective validation result 50A2 (e.g., including indication of whether the assignment is valid or not).

In some embodiments, validating ML-based model 50 may be further configured to validate the assignment of the particular class (e.g., class 40A11) to incoming data sample 20A1 by determining that calculated similarity metric value 50A1 exceeds a predefined similarity metric value threshold (e.g., predefined by similarity metric threshold setup 52A).

In some embodiments, validating ML-based model 50 may be further configured to calculate similarity metric value 50A1 and compare calculated similarity metric value 50A1 with the similarity metric threshold value (e.g., predefined by similarity metric threshold setup 52A) serially (i.e., by considering previously classified data samples one by one).

Said serial actions may be performed until validating ML-based model 50 finds the previously classified data sample similar enough to incoming data sample 20A. Validating ML-based model 50 may be further configured to terminate these serial actions (i.e., the calculation and comparison indicated above), once the at least one of the previously classified data samples (e.g., data samples of training dataset 51A1), for which the calculated similarity metric value 50A1 exceeds the predefined similarity metric value threshold, is found.

It should be understood that, within the scope of the present invention defined by the claims, other approaches may also be applied in regard to calculating similarity metric value 50A1 and validating assignment of the particular class to incoming data sample 20A1. E.g., in some alternative embodiments, validating ML-based model 50 may be configured to calculate similarity metric value 50A1, based on incoming data sample 20A1 and two or more previously classified data samples of the particular class at a time.

In some embodiments, system 10 may further include classification output module 70. Classification output module 70 may be further configured to receive incoming data sample 20A1, assigned class 40A11 and validation result 50A2. Classification output module 70 may be further configured to output either classified incoming data sample 70A1 (incoming data sample 20A1 with assigned class 40A11) or classification error 70A2, depending on validation result 50A2.

More particularly, classification output module 70 may be configured to output classified incoming data sample 70A1 in the following cases: (a) confidence metric value 40A1 exceeds the predefined confidence metric value threshold (e.g., predefined by confidence metric threshold setup 41A) and, consequently, no validation is required; and (b) confidence metric value 40A1 does not exceed the predefined confidence metric value threshold, however, validating ML-based model 50 has found the previously classified data sample (e.g., of data samples of training dataset 51A1) similar enough to incoming data sample 20A1 (i.e., having similarity metric value 50A1 that exceeds the predefined similarity metric value threshold).

Classification output module 70 may be configured to output classification error 70A2 when confidence metric value 40A1 does not exceed the predefined confidence metric value threshold; and validating ML-based model 50 has not found any previously classified data sample (e.g., of data samples of training dataset 51A1) similar enough to incoming data sample 20A1 (i.e., none of calculated similarity metric values 50A1 exceeds the predefined similarity metric value threshold).

Hence, system 10 is configured to receive incoming data samples 20A as an input and obtain classified incoming data sample 70A1 as an output.

In some embodiments system 10 may further include training module 60. System 10 may be further configured to supplement the initial training dataset 51A1 with classified incoming data sample 70A1, thereby obtaining supplemented training dataset 51A2. System 10 may be further configured to perform supplementary training of classifying ML-based model 40, based on classified incoming data sample 70A1. More particularly, training module 60 may be further configured to train classifying ML-based model 40 to assign classes of the plurality of classes to data samples (e.g., incoming data samples 20A), based on supplemented training dataset 51A2.

Such supplementary training may provide additional technical improvement of increasing classification reliability. The additional technical improvement may be provided as a result of incremental increase of classifying ML-based model 40 performance, which may be achieved by training using an extended set of training examples. Such supplementary training may be even more effective when classified incoming data sample 70A1, that is used for supplementing training dataset 51A1, may be considered an outlier of the particular class. The more "currently outlying" data samples (e.g., like classified incoming data sample 70A1) for training are used, the less "outlying" these data samples will be considered by ML-based model (e.g., classifying ML-based model 40) after the supplementary training.

Figure 2B:
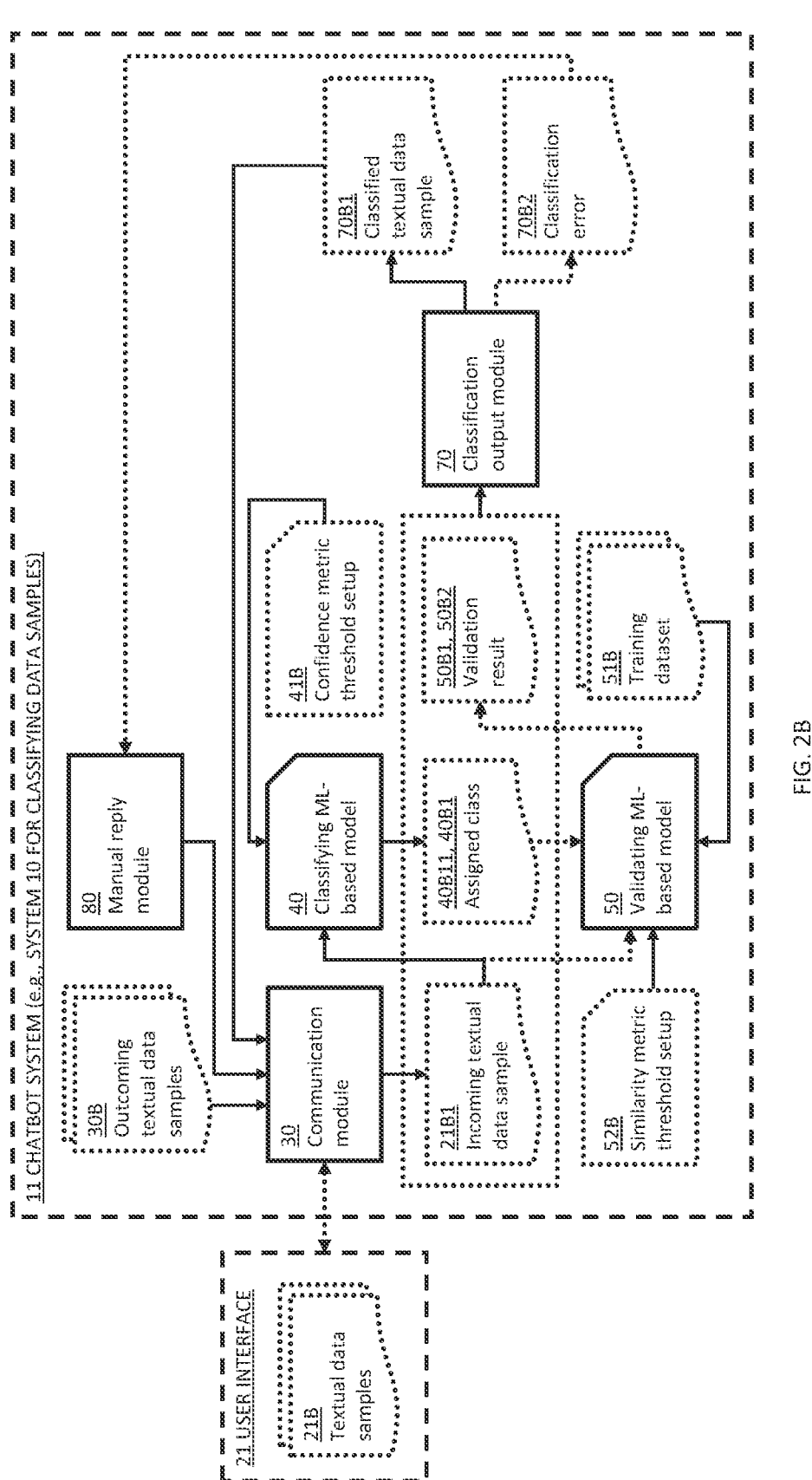
FIG. 2B is a block diagram, depicting a chatbot system provided as an embodiment of the system for classifying data samples.

Reference is now made to FIG. 2B, which depicts chatbot system 11 provided as an embodiment of system 10 for classifying data samples.

Embodiment represented in FIG. 2B is similar in general aspects to embodiment represented in FIG. 2A, except for the further described aspects. For the purpose of clarity, similar elements are indicated with identical numeric references. Letters indicated in the references correspond to the alphanumeric reference of the respective figure ("A" and "B" respectively).

In some embodiments, system 11 may be connected to user interface 21. In some embodiments, user interface 21 may be a part of system 11. In alternative embodiments, user interface 21 may be a separate element or system and be connected to system 11 via local area network (LAN) or wide area network (WAN).

Communication module 30 of system 11 may be configured to receive incoming textual data samples 21B, provided by user interface 21 (same as incoming data samples 20A in embodiment represented in FIG. 2A). Textual data samples 21B may represent users' requests in the form of textual messages.

As can be seen in FIG. 2B, system 11 may be configured to transmit classified textual data sample 70B1 to communication module 30. Communication module 30 may be further configured to select outcoming textual data sample 30B (e.g., representing responding to specific user's request), based on assigned class 40B11 of classified textual data sample 70B1. E.g., assigned class 40B11 may correspond to specific problem commonly addressed by users in their requests, and respective outcoming textual data sample 30B may represent suggested solution to the problem. Communication module 30 may be further configured to transfer selected outcoming textual data sample 30B to user interface 21, so as to be presented to the user.

In some embodiments, system 11 may further include manual reply module 80 and be configured to communicate classification error 70B2 thereto. Manual reply module 80 may be configured to trigger connection between a human agent and a user, upon receiving classification error 70B2. In some embodiments, system 11 may include additional user interface (not shown in figures) to establish communication with human agent.

Elements directed to supplementary training are omitted in FIG. 2B for the purpose of clarity.

Reference is now made to FIGS. 3A-3E, which depict diagrams explaining the concept of the claimed invention in example, according to some embodiments.

Said diagrams depict distribution of data samples in the feature space, defined by features A and B.

As shown in FIG. 3A, training dataset 51A1 includes data samples labeled (classified) by pertinence to two classes: first class 40A11 is marked by triangles and second class 40A12 is marked by circles. Classifying ML-based model 40, pretrained based on illustrated training dataset 51A1, has decision boundary 40A21. Decision boundary 40A21 defines the division of the feature space into classes 40A11 and 40A12 by trained classifying ML-based model 40 in order to provide classification.

It should be understood that ML-based training does not necessarily have to provide decision boundary (e.g., decision boundary 40A21) that perfectly corresponds to the division of labeled data samples into classes, as it is defined by the training dataset (e.g., training dataset 51A1). Otherwise, the known phenomenon of overfitting may occur, thereby decreasing the reliability of prediction in regard to new incoming data samples. Hence, as can be seen in FIGS. 3A-3E, some labeled data samples of classes 40A11 and 40A12 (circles and triangles respectively) are left from the wrong side of decision boundary 40A21. It should also be clear that such labeled data samples are not necessarily outliers—they may still be sufficiently similar to the majority of data samples of the class they pertain to.

As can be seen in FIGS. 3A-3E, labeled data sample 40A111 that pertains to class 40A11 may be considered an outlier since it is located far from the majority of labeled data samples of the same class 40A11 in the feature space. Obviously, by applying classifying ML-based model 40 that has decision boundary 40A21, it is hard to classify anew incoming data sample (e.g., data sample 20A1) reliably and confidently enough, if it actually pertains to class 40A11, but is located, for example, in the same area of feature space as an outlier (e.g., labeled data sample 40A111).

According to the example, the classification of incoming data sample 20A1 is requested. In FIG. 3A non-classified incoming data sample 20A1 is marked by square.

As can be seen, new incoming data sample 20A1 is located close to decision boundary 40A21. Hence, as shown in FIG. 3B, inferring of classifying ML-based model 40 on incoming data sample 20A1 provides assignment of class 40A11 to incoming data sample 20A1, however, this assignment does not provide confidence metric value 40A1 (not indicated in FIGS. 3A-3E) high enough, i.e., confidence metric value 40A1 does not exceed the predefined confidence metric value threshold. Hence, according to the claimed invention, validation of the assignment of class 40A11 to incoming data sample 20A1 must be triggered. As shown in FIG. 3B, incoming data sample 20A1 is marked by dash-lined triangle, corresponding to not sufficiently confident assignment of class 40A11.

As shown in FIG. 3C, validating ML-based model 50 calculates similarity metric values 50A1 representing a degree of similarity between incoming data sample 20A1 and labeled data samples of class 40A11. The closer labeled data sample is located to incoming data sample 20A1, the higher the degree of similarity.

According to the claimed method, since labeled data sample 40A111 is located close enough to incoming data sample 20A1, respective similarity metric value 50A1 (marked by the shortest double arrow) may exceed the predefined similarity metric value threshold.

Hence, as shown in FIG. 3D, the assignment of class 40A11 may be validated and respective validation result 50A2 may be provided. Thus, as a result of classification, system 10 may obtain classified incoming data sample 70A1 representing incoming data sample 20A1 with assigned class 40A11 thereto. As shown in FIG. 3D, classified incoming data sample 70A1 is marked by solid-lined triangle, corresponding to validated assignment of class 40A11 thereto.

As shown in FIG. 3E, after performing supplementary training, based on training dataset (e.g., supplemented training dataset 51A2), which was supplemented by including classified incoming data sample 70A1, classifying ML-based model 40 has improved decision boundary 40A22 more precisely representing the actual division of feature space into classes 40A11 and 40A12.

Referring now to FIG. 4, a flow diagram is presented, depicting a method of classifying data samples by at least one processor, according to some embodiments.

As shown in step S1005, the at least one processor (e.g., processor 2 of FIG. 1) may perform receiving of at least one incoming data sample (e.g., incoming data sample 20A1). Step S1005 may be carried out by communication module 30 (as described with reference to FIGS. 2A-2B).

As shown in step S1010, the at least one processor (e.g., processor 2 of FIG. 1) may perform inferring of a pretrained classifying machine learning (ML)-based model (e.g., classifying ML-based model 40) on the at least one incoming data sample (e.g., incoming data sample 20A1), to assign a particular class of a plurality of classes (e.g., classes 40A11 and 40A12) thereto. Step S1010 may be carried out by system 10 and classifying ML-based model 40 (as described with reference to FIGS. 2A-2B).

As shown in step S1015, the at least one processor (e.g., processor 2 of FIG. 1) may perform calculation of a similarity metric value (e.g., similarity metric value 50A1) representing a degree of similarity between the at least one incoming data sample (e.g., incoming data sample 20A1) and one or more previously classified data samples of the particular class (e.g., data samples of the plurality of data samples of training dataset 51A1 pertaining to class 40A11). Step S1015 may be carried out by validating ML-based model 50 (as described with reference to FIGS. 2A-2B).

As shown in step S1020, the at least one processor (e.g., processor 2 of FIG. 1) may perform validation of assignment of the particular class (e.g., class 40A11) to the at least one incoming data sample (e.g., incoming data sample 20A1), based on the calculated similarity metric value (e.g., similarity metric value 50A1), thereby obtaining at least one classified incoming data sample (e.g., classified incoming data sample 70A1). Step S1015 may be carried out by validating ML-based model 50 and classification output module 70 (as described with reference to FIGS. 2A-2B).

As can be seen from the provided description, the claimed invention represents system and method for classifying data samples, which provide the technical improvement of ML-based classification by increasing reliability of classification with respect to data samples which may be considered as class outliers.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of classifying data samples by at least one processor, the method comprising:

receiving at least one incoming data sample;

inferring a pretrained classifying machine-learning (ML)-based model on the at least one incoming data sample, to assign a particular class of a plurality of classes thereto, and wherein said inferring further comprises:

calculating a confidence metric value representing confidence of assignment of the particular class to the at least one incoming data sample; and triggering validating the assignment of the particular class to the at least one incoming data sample, when the calculated confidence metric value does not exceed a predefined confidence metric value threshold;

calculating a similarity metric value representing a degree of similarity between the at least one incoming data sample and one or more previously classified data samples of the particular class; and validating assignment of the particular class to the at least one incoming data sample, based on the calculated similarity metric value, thereby obtaining at least one classified incoming data sample.

2. The method of claim 1, wherein calculating the similarity metric value is performed by using a validating ML-based model; wherein the validating ML-based model is configured to calculate the similarity metric value based on the at least one incoming data sample and the one or more previously classified data samples of the particular class.

3. The method of claim 2, wherein the validating ML-based model is a nearest neighbor type classifier.

4. The method of claim 1, wherein validating the assignment of the particular class to the at least one incoming data sample further comprises determining that the calculated similarity metric value exceeds a predefined similarity metric value threshold.

5. The method of claim 4, wherein calculating the similarity metric value with respect to the one or more previously classified data samples of the particular class is performed serially, to find at least one of the previously classified data samples, for which the calculated similarity metric value exceeds the predefined similarity metric value threshold.

6. The method of claim 1, wherein the at least one incoming data sample and the one or more previously classified data samples are represented as vectors and the similarity metric value is a cosine similarity metric value.

7. The method of claim 1, wherein the classifying ML-based model is pretrained so as to assign classes of the plurality of classes to data samples.

15

8. The method of claim 7, wherein the classifying ML-based model is pretrained based on an initial training dataset, the initial training dataset comprising a plurality of data samples having classes of the plurality of classes assigned thereto.

9. The method of claim 8, wherein the method further comprises performing supplementary training of the classifying ML-based model, based on the at least one classified incoming data sample.

10. The method of claim 9, wherein the supplementary training of the classifying ML-based model comprises supplementing the initial training dataset with the at least one classified incoming data sample, thereby obtaining a supplemented training dataset; and training the classifying ML-based model to assign classes of the plurality of classes to data samples, based on the supplemented training dataset.

11. A system for classifying data samples, the system comprising: a non-transitory memory device, wherein modules of instruction code are stored, and at least one processor associated with the memory device, and configured to execute the modules of instruction code, whereupon execution of said modules of instruction code, the at least one processor is configured to:

receive at least one incoming data sample;

infer a pretrained classifying machine-learning (ML)-based model on the at least one incoming data sample, to assign a particular class of a plurality of classes thereto, and wherein said inferring further comprises:

calculating a confidence metric value representing confidence of assignment of the particular class to the at least one incoming data sample; and triggering validating the assignment of the particular class to the at least one incoming data sample, when the calculated confidence metric value does not exceed a predefined confidence metric value threshold;

calculate a similarity metric value representing a degree of similarity between the at least one incoming data sample and one or more previously classified data samples of the particular class; and validate assignment of the particular class to the at least one incoming data sample, based on the calculated similarity metric value, thereby obtaining at least one classified incoming data sample.

12. The system of claim 11, wherein the at least one processor is further configured to validate the assignment of the particular class to the at least one incoming data sample by determining that the calculated similarity metric value exceeds a predefined similarity metric value threshold.

13. The system of claim 11, wherein the at least one incoming data sample and the one or more previously classified data samples are represented as vectors and the similarity metric value is a cosine similarity metric value.

14. The system of claim 11, wherein the classifying ML-based model is pretrained so as to assign classes of the plurality of classes to data samples.

15. The system of claim 14, wherein the classifying ML-based model is pretrained based on an initial training dataset, the initial training dataset comprising a plurality of data samples having classes of the plurality of classes assigned thereto.

16. The system of claim 15, wherein the at least one processor is further configured to perform supplementary training of the classifying ML-based model, based on the at least one classified incoming data sample.

17. The system of claim 16, wherein the at least one processor is further configured to perform supplementary training of the classifying ML-based model by supplementing the initial training dataset with the at least one classified incoming data sample, thereby obtaining a supplemented training dataset; and training the classifying ML-based model to assign classes of the plurality of classes to data samples, based on the supplemented training dataset.

18. The system of claim 11, wherein the at least one processor is further configured to calculate the similarity metric value by using a validating ML-based model; wherein the validating ML-based model is configured to calculate the similarity metric value based on the at least one incoming data sample and the one or more previously classified data samples of the particular class; and wherein the validating ML-based model is based on a nearest neighbor type classifier.

* * * * *